United States Patent [19]

Hauenstein

[11] 4,150,306
[45] Apr. 17, 1979

[54] BLOCKING CONVERTER FOR FLASH EQUIPMENT

[75] Inventor: Alfred Hauenstein, Munich, Fed. Rep. of Germany

[73] Assignee: Siemens Aktiengesellschaft, Berlin & Munich, Fed. Rep. of Germany

[21] Appl. No.: 801,456

[22] Filed: May 31, 1977

[30] Foreign Application Priority Data

Jul. 16, 1976 [DE] Fed. Rep. of Germany ....... 2632224

[51] Int. Cl.² .................... H03K 17/56; G05F 1/20
[52] U.S. Cl. ............................. 307/246; 307/293; 315/241 P
[58] Field of Search ............... 315/241 P; 307/246, 307/293; 354/145; 320/1

[56] References Cited

U.S. PATENT DOCUMENTS

| 3,319,076 | 5/1967 | Gerig | 328/67 |
| 3,873,893 | 3/1975 | Bianchini | 307/246 |
| 4,071,884 | 1/1978 | Malgret | 315/241 P |

*Primary Examiner*—Stanley D. Miller, Jr.
*Assistant Examiner*—B. P. Davis
*Attorney, Agent, or Firm*—Hill, Gross, Simpson, Van Santen, Steadman, Chiara & Simpson

[57] ABSTRACT

A blocking converter is provided having a switching transistor controlled via a triggered monoflop with a defined on-time RC circuit which insures that the same electric energy quantity is always stored in a transformer driven by the switching transistor. The electrical energy is reversed to charge the charge capacitor during a blocking phase of the switching transistor. As soon as the reverse charge process is completed, the monoflop is retriggered. The blocking converter is preferably used in battery-operated electronic flash equipment for photography.

5 Claims, 7 Drawing Figures

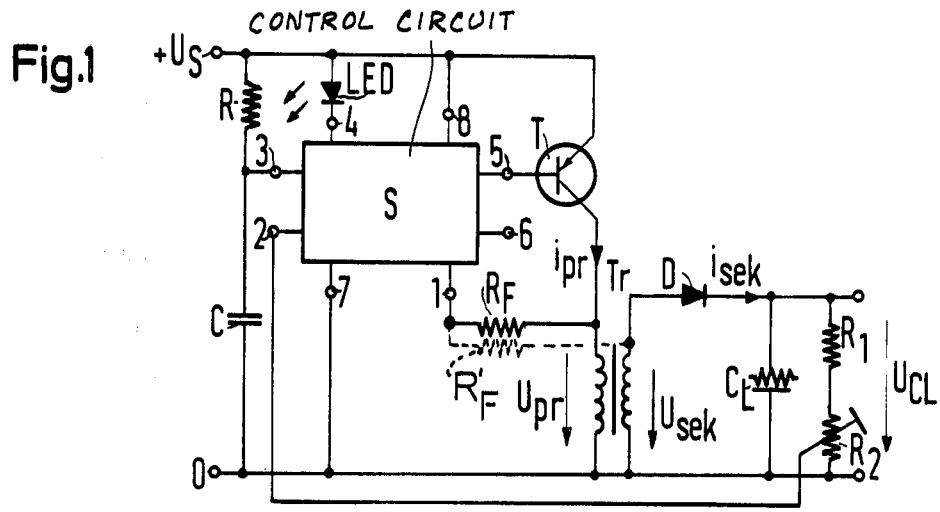
Fig.1
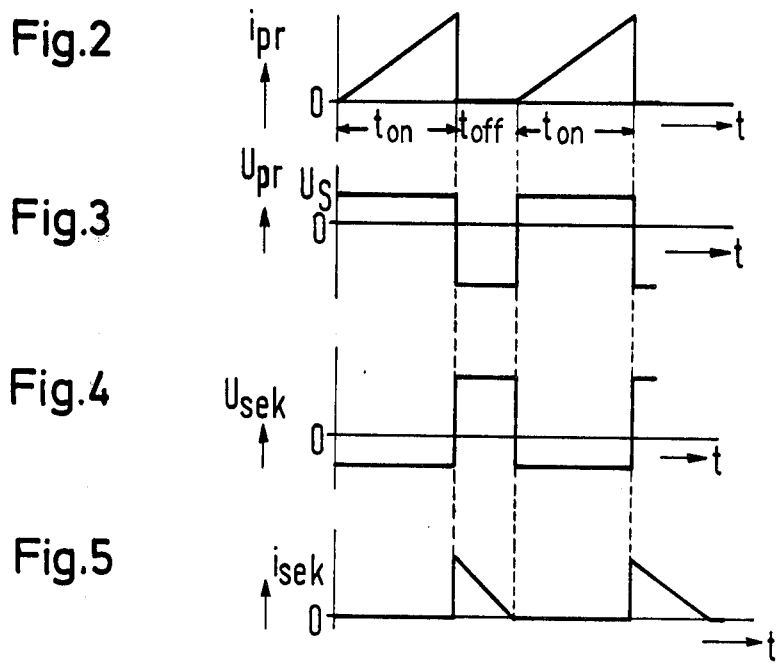
Fig.2
Fig.3
Fig.4
Fig.5

BLOCKING CONVERTER FOR FLASH EQUIPMENT

BACKGROUND OF THE INVENTION

The invention relates to a blocking converter particularly suited for secondary-cell or battery driven photographic flash equipment having a switching transistor and a transformer whose primary winding is connected in the collector circuit of the switching transistor, and whose secondary winding charges a charging capacitor via a rectifier diode. A rectifier diode is connected to the transformer secondary in such a manner that it only conveys current when the switching transistor is turned off. A trigger circuit periodically turns the switching transistor on and off.

Self-oscillating flow converters are at present mostly used in electronic flash equipment for the charging of the flash capacitors. Germanium transistors are employed as switching transistors due to their advantageous properties. Blocking converters have more favorable properties than flow converters, particularly a considerably higher efficiency. SInce, however, in electronic flash equipment they require a greater circuit expense than flow converters, they have not been commercially successful up to now.

Blocking converters operate in accordance with the following principle. A linearly rising current flows in the primary winding of the transformer during the on-time of the switching transistor. The energy stored in the transformer is conveyed to the charging (flash) capacitor during the subsequent blocking time of the transistor. The transistor operates continuously with the same comparatively low switching power so that an operation even with low power devices is possible. Even if short circuits occur at the output, the transistor cannot be overloaded. Electrolytic capacitors stored for a long time can therefore be formed in continuous operation without damage to the apparatus. Since the fly-back voltage is used for charging, the transmission ratio of the primary winding to the secondary winding can be selected smaller than the ratio of battery voltage to charging voltage.

If an automatic cutoff is additionally provided, then one always obtains the same charging voltage, even with a varying battery supply voltage, and thus the same energy is stored in the capacitor.

The blocking converters commonly used up to now are of the self-oscillating type, a control energy being produced via an additional feedback winding on the transformer. The switching transistor is biased in such a manner that it is conducting when the battery voltage is turned on. As soon as the transformer is saturated or the transistor saturation voltage rises, the control voltage induced in the feedback winding becomes zero. The transistor begins to block. The collapsing magnetic field in the transformer, produces a high voltage, the so-called fly-back voltage. As soon as the energy stored in the transformer is reversed into the charging capacitor, the blocking voltage induced in the feedback winding again becomes zero, whereby the switching transistor again becomes conducting, and again electric energy is stored in the transformer. The disadvantage in self-oscillating blocking converters is that without an individual adjustment, an optimal operating condition is not possible in each case.

SUMMARY OF THE INVENTION

It is an object of the present invention to improve the above described blocking converter in such a manner that without individual adjustment, even with relatively large tolerances of the components utilized (particularly of the current gain of the switching transistors), ideal operation is possible in a optimum working range.

This object is achieved in that the triggering of the switching transistor results by means of a monoflop (a monostable flip-flop), whose on-time is set by means of an external RC circuit, that a trigger circuit is provided immediately triggering the monoflop as soon as the electric energy stored in the transformer is reversed into the charging capacitor, and that a detector element is provided for measuring a magnitude characteristic of the energy stored in the transformer during the blocking phase of the switching transistor.

The customary self-control used up to now is replaced by an external control with the aid of the monoflop in the inventive blocking converter. Therefore, the advantages of a defined switch-on time of the transistor result so that the transformer cannot reach saturation, and that the re-turning-on of the transistor results only when the energy stored in the transformer has been reduced, so that small power dissipations result in the transistor, and the saturation of the transformer is avoided by means of adding the newly stored energy to the residual energy.

BRIEF DESCRIPTION OF THE DRAWINGS

FIG. 1 illustrates a schematic diagram of a blocking converter of the invention;

FIG. 2 illustrates the variation of primary current with respect to time of a transformer in the blocking converter of FIG. 1;

FIG. 3 illustrates the variation of primary voltage with respect to time for the transformer in FIG. 1;

FIG. 4 illustrates the variation of secondary voltage with respect to time for the transformer in FIG. 1;

FIG. 5 illustrates the variation of secondary current with respect to time for the transformer in FIG. 1;

DESCRIPTION OF THE PREFERRED EMBODIMENTS

Figure 6:
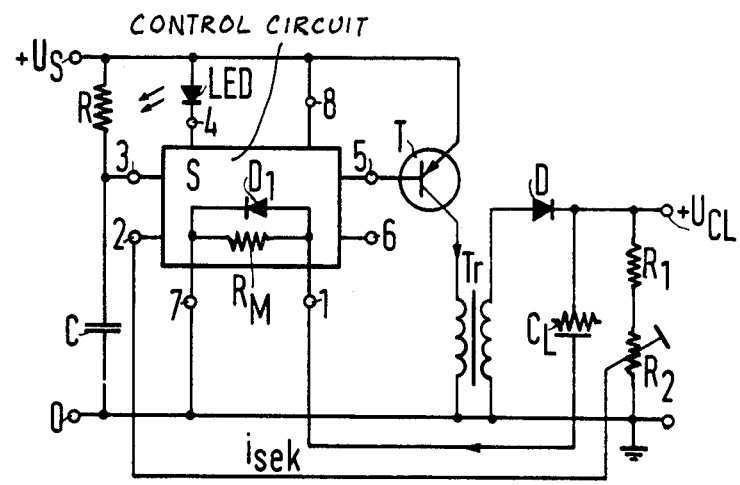
FIG. 6 illustrates a schematic diagram of another embodiment of the blocking converter of this invention.

FIG. 1 illustrates a blocking converter operating in accordance with the invention, wherein the fly-back voltage is evaluated in the primary or secondary winding as a characteristic magnitude for the energy stored in the transformer. A switching pnp-transistor T is illustrated in whose collector circuit lies the primary winding of the transformer Tr. The triggering of the switching transistor T results via a control circuit S (discussed with respect to FIG. 7) at terminal 5. The RC-element having a resistor R and a capacitor C is connected to terminal 3 of the control circuit S, said RC-element forming the time-constant for a monoflop in the control circuit S. The terminals 7 and 8 convey the power source voltage $U_S$ to the control circuit S. Terminal 1 of the control circuit S is connected with the primary winding of the transformer Tr via a detector resistor $R'_F$. Alternatively, the detector resistor $R_F$ may be connected to the secondary winding. The secondary winding of the transformer Tr is coupled to the charging capacitor $C_L$ via a high voltage diode D. A voltage divider formed by the resistors $R_1$, $R_2$ lies parallel to the charging capacitor $C_L$. A portion of the voltage tapped by the voltage divider is conveyed to the terminal 2 of the control circuit S, where it prevents the re-turning-on of the monoflop, as soon as the desired operating voltage is reached at the charging capacitor $C_L$. The attaining of the nominal voltage can additionally be indicated by means of a luminous diode LED connected to the terminal 4. The control circuit S can also contain a terminal 6 allowing the triggering of npn-switching transistors. If one connects the resistor $R'_F$ with the secondary winding of the transformer Tr instead of the primary winding, then the secondary voltage is evaluated as the criterion for the energy stored in the transformer Tr.

FIG. 2 illustrates the variation of the primary current $i_{pr}$ in dependence upon time t. The primary current rises linearly during the individual on-time $t_{on}$. As soon as the on-time established by the RC-element is finished, the primary current drops to zero and then rises again after completion of the turn-off time $t_{off}$.

FIG. 3 illustrates the variation of the primary voltage $U_{pr}$ in dependence upon time t. During the turned-on time $t_{on}$, the primary voltage almost has the approximately value of the supply voltage $U_S$. After completing the turned-on time $t_{on}$, the primary voltage attains a relatively high negative value, the fly-back voltage. This value remains during the total turned-off time $t_{off}$, and rises suddenly to the value of the supply voltage $U_S$ when the switching transistor is turned on again.

FIG. 4 illustrates the variation of the secondary voltage $U_{sek}$. It has a relatively small negative value during the turned-on time $t_{on}$, and it has a relatively high positive value during the turned-off time $t_{off}$. The value of the fly-back voltage is dependent on the charge condition of the capacitor $C_L$. It self-adjusts in such a manner that the secondary current $i_{sek}$ determined by the design of the circuit flows into the capacitor as charge current.

FIG. 5 illustrates the variation of the secondary current $i_{sek}$ in dependent upon time t. One recognizes that the secondary current $i_{sek}$ has a zero value during the turned-on time $t_{on}$, jumps to its maximum value at the beginning of the turned-off time $t_{off}$, and continuously decreases towards zero during the turned-off time $t_{off}$.

As was already initially mentioned, the turned-on time $t_{on}$ is determined by means of the magnitude of the RC-element, so that a constant energy is stored in the transformer. In contrast thereto, the turned-on time $t_{off}$ is variable. In charging capacitors having little charge, the turned-off time is relatively long. The turned-off time decreases continuously with increasing voltage in the charging capacitor.

FIG. 6 illustrates another embodiment of the blocking converter of this invention in which the secondary current is evaluated as a criterion for the retriggering of the monoflop. For this purpose the parallel circuit consisting of a measuring resistor $R_M$ and a diode $D_1$ is provided between the terminals 1 and 7 in the control circuit S. The terminal 1 of the control circuit S is connected with a lower end of the charging capacitor $C_L$ so that the secondary current $i_{sek}$ has to flow across the measuring resistor and the measuring diode. The transistor T is retriggered as soon as the falling current in the measuring resistor falls below a prescribed switching threshold. It is also possible to connect the terminal 1 with the lower end of the secondary winding, and to directly connect the lower end of the charging capacitor to ground. The diode $D_1$ limits the voltage drop in the measuring resistor $R_M$ to the diode forward voltage.

Figure 7:
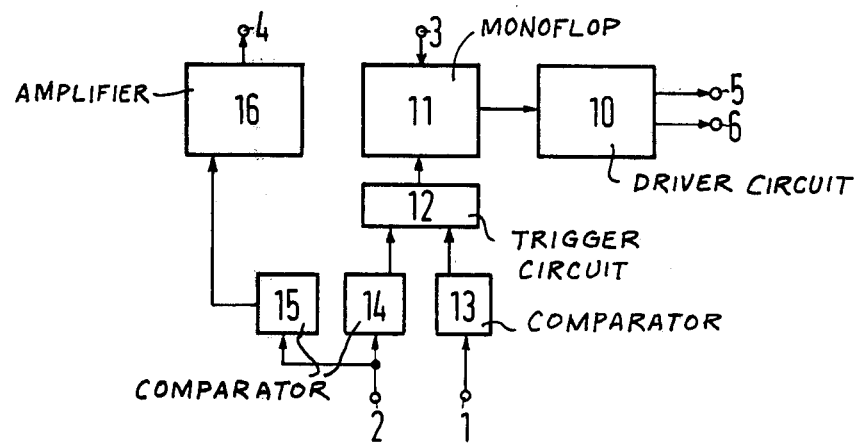
FIG. 7 illustrates a block diagram of the control circuit S of this invention as shown in FIG. 1 and 6.

FIG. 7 illustrates a block diagram of the control circuit S as used by this invention. The individual circuits are well known by literature. One recognizes a monoflop 11 having a connection 3 for the RC-element, as well as a driver circuit 10 connected at an output side of the monoflop for the control of the switching transistor T via the connection terminals 5 or 6. A trigger circuit 12 is connected in series to the monoflop 11. The trigger circuit 12 receives its information from a comparator 13 producing an output signal as soon as the measuring signal (voltage or current) at the terminal 1 corresponding with the energy stored in the transformer falls below a defined switching threshold. An additional comparator 14 is connected in series to the trigger circuit 12, said comparator providing an output signal as soon as the voltage at the terminal 2 and proportional with the charging voltage of the capacitor $C_L$ exceeds a defined switching threshold. An additional comparator 15 provides a signal to an amplifier 16 with the aid of which a luminous diode LED abutting the terminal 4 is turned on as soon as a flash readiness condition exists. The control circuit S is preferably constructed as an integrated semiconductor circuit.

Although various minor modications may be suggested by those versed in the art, it should be understood that I wish to embody within the scope of the patent warranted hereon, all such embodiments as reasonably and properly come within the scope of my contribution to the art.

I claim as my invention:

1. A blocking converter for secondary-cell or battery-type flash equipment comprising:
   a switching transistor;
   a transformer having a primary winding arranged in a collector circuit of the switching transistor and a secondary winding arranged to charge a charge capacitor via a rectifier diode;
   the rectifier diode being arranged such that it passes substantial current only when the switching transistor is turned off;
   a control circuit means for periodically turning on and off the switching transistor;
   said control circuit means including a monostable flip-flop means for triggering the switching transistor, a turned-on time of the monostable flip-flop means being set by an RC circuit, and a trigger circuit means for immediately triggering the monostable flip-flop means when the energy stored in the transformer is converted into the charge capacitor;
   a detector means connected to said control circuit means for measuring a characteristic value for the energy stored in the transformer during a blocking phase of the switching transistor by measuring primary voltage of the transformer; and
   the detector means being a voltage divider.

2. A blocking converter for secondary-cell or battery-type flash equipment comprising:
   a switching transistor;
   a transformer having a primary winding arranged in a collector circuit of the switching transistor and a secondary winding arranged to charge a charge capacitor via a rectifier diode;
   the rectifier diode being arranged such that it passes substantial current only when the switching transistor is turned off;

a control circuit means for periodically turning on and off the switching transistor;

said control circuit means including a monostable flip-flop means for triggering the switching transistor, a turned-on time of the monostable flip-flop means being set by an RC circuit, and a trigger circuit means for immediately triggering the monostable flip-flop means when the energy stored in the transformer is converted into the charge capacitor;

a detector means connected to said control circuit means for measuring a characteristic value for the energy stored in the transformer during a blocking phase of the switching transistor by measuring a secondary current of the transformer; and the detector means being a resistor for sensing secondary current.

3. A blocking converter for secondary-cell or battery-type flash equipment comprising:

a switching transistor;

a transformer having a primary winding arranged in a collector circuit of the switching transistor and a secondary winding arranged to charge a charge capacitor via a rectifier diode;

the rectifier diode being arranged such that it passes substantial current only when the switching transistor is turned off;

a control circuit means for periodically turning on and off the switching transistor;

said control circuit means including a monostable flip-flop means for triggering the switching transistor, a turned-on time of the monostable flip-flop means being set by an RC circuit, and a trigger circuit means for immediately triggering the monostable flip-flop means when the energy stored in the transformer is converted into the charge capacitor;

a detector means connected to said control circuit means for measuring a characteristic value for the energy stored in the transformer during a blocking phase of the switching transistor by measuring a secondary current of the transformer; and the detector means being a diode for sensing secondary current.

4. A blocking converter for secondary-cell or battery-type flash equipment comprising:

a switching transistor;

a transformer having a primary winding arranged in a collector circuit of the switching transistor and a secondary winding arranged to charge a charge capacitor via a rectifier diode;

the rectifier diode being arranged such that it passes substantial current only when the switching transistor is turned off;

a control circuit means for periodically turning on and off the switching transistor;

said control circuit means including a monostable flip-flop means for triggering the switching transistor, a turned-on time of the monostable flip-flop means being set by an RC circuit, and a trigger circuit means for immediately triggering the monostable flip-flop means when the energy stored in the transformer is converted into the charge capacitor;

a detector means connected to said control circuit means for measuring a characteristic value for the energy stored in the transformer during a blocking phase of the switching transistor; and a comparator means being provided for blocking the monostable flip-flop means as soon as the voltage on the charge capacitor has attained its operating value.

5. A blocking converter in accordance with claim 4, characterized in that another comparator means is provided for turning on an indicator device as soon as the voltage on the charge capacitor has attained a preselected value below the operating value in the charge capacitor.

* * * * *